UNITED STATES PATENT OFFICE.

GUY KING, OF ATLANTA, AND CHARLES G. ADSIT, OF TALLULAH FALLS, GEORGIA.

MEDICATED CHEWING-GUM.

1,396,641.     Specification of Letters Patent.     Patented Nov. 8, 1921.

No Drawing.     Application filed March 12, 1921. Serial No. 451,771.

*To all whom it may concern:*

Be it known that we, GUY KING, a citizen of the United States, residing at Atlanta, in the county of Fulton and State of Georgia, and CHARLES G. ADSIT, a citizen of the United States, residing at Tallulah Falls, in the county of Rabun and State of Georgia, have invented a new and useful Medicated Chewing-Gum, of which the following is a specification.

The object of our invention is to incorporate into chewing gum a compound having antiseptic and germicidal properties and so treat the mixture that the antiseptic and germicide will not deteriorate or be lost before the gum is masticated. Also that when the saliva of the mouth comes in contact with the substances incorporated with the gum, certain germicidals will be liberated that act as a germicide on whatever bacteria may be in the mouth at the time of mastication.

A further object of the invention is to use compounds in the mixture sufficiently concentrated as not to give an undesirable taste to the gum.

Our compound consists of the substances known as the chloroamin group,—preferably paratoluene sodium sulfo chloroamin; this substance, or one of the chloroamins properly incorporated with the ordinary chewing gum mixture. This substance may be incorporated directly with the ordinary chewing gum mixture or by first making a solution of the chloroamin in thymol, then mixing with chlorinated paraffin or chlorinated paraffin oil and incorporating with the ordinary chewing gum mixture.

In preparing our mixture, we prefer to have the final ingredients so that there will be one thousand, (1000) parts of the chewing gum to five (5) parts or less of the chloroamin.

This mixture so far as now understood, seems to have the property of being a stable mixture holding chlorin, but when brought in contact with the saliva of the mouth, the chlorin gas is liberated, and it, in connection with the other substances present, act as an antiseptic, germicide and dentifrice.

We claim

1. A medicated chewing gum comprising the ordinary chewing gum ingredients and having incorporated therein a chloroamin.

2. A medicated chewing gum comprising the ordinary chewing gum and one or more of the chloroamins in about the proportion of one thousand (1000) parts of the former to five (5) parts, or less, of the latter.

3. A medicated chewing gum comprising the ordinary chewing gum, carrying a compound which releases chlorin on coming in contact with the saliva of the mouth.

4. A medicated chewing gum comprising the ordinary chewing gum carrying a chloroamin dissolved in thymol.

5. A medicated chewing gum comprising the ordinary chewing gum and one of the chloroamins which will ordinarily hold the chlorin but which on coming into contact with the saliva of the mouth liberates chlorin and other substances which in turn acts as an antiseptic, germicide and dentifrice.

In testimony whereof, we have hereunto set our hands this 10 day of March 1921.

GUY KING.
CHAS. G. ADSIT.